US005575946A

United States Patent [19]

Beck et al.

[11] Patent Number: 5,575,946

[45] Date of Patent: Nov. 19, 1996

[54] WATER-SOFTENING COMPOSITIONS

[75] Inventors: Rudolf Beck, Marl; Frank Krause, Kleve; Udo Schoenkaes, Haltern, all of Germany

[73] Assignee: Chemische Fabrik Stockhausen GmbH, Krefeld, Germany

[21] Appl. No.: 233,955

[22] Filed: Apr. 28, 1994

[30] Foreign Application Priority Data

Apr. 28, 1993 [DE] Germany .......................... 43 13 908.6

[51] Int. Cl.[6] .............................................. C02F 5/10

[52] U.S. Cl. .......................... 252/181; 510/337; 510/361; 510/471; 510/511

[58] Field of Search .............................. 252/181, 174.24, 252/174.23, DIG. 2

[56] References Cited

U.S. PATENT DOCUMENTS

| | | | |
|---|---|---|---|
| 3,955,920 | 5/1976 | Krauch et al. | 252/90 |
| 4,473,485 | 9/1984 | Greene | 252/174.24 |
| 4,647,396 | 3/1987 | Denzinger et al. | 252/174.24 |
| 4,702,858 | 10/1987 | Denzinger et al. | 252/174.24 |
| 4,897,215 | 1/1990 | Trieselt et al. | 252/174.24 |
| 5,370,816 | 12/1994 | Balzer et al. | 252/132 |

FOREIGN PATENT DOCUMENTS

| | | |
|---|---|---|
| 0391711 | 10/1990 | European Pat. Off. . |
| 0404377 | 12/1990 | European Pat. Off. . |
| 0419970 | 4/1991 | European Pat. Off. . |
| 0451508 | 10/1991 | European Pat. Off. . |
| WO92/07928 | 5/1992 | WIPO . |

*Primary Examiner*—Prince Willis, Jr.
*Assistant Examiner*—James M. Silbermann
*Attorney, Agent, or Firm*—Oblon, Spivak, McClelland, Maier & Neustadt, P.C.

[57] ABSTRACT

Water-softening formulations which comprise:

(a) a biodegradable copolymer;

(b) an inorganic water-softening silicate; and, optionally, (c) another inorganic salt;

(d) a dispersing and complexing agent; and (e) a surfactant and also additional customary additives have improved biodegradability.

15 Claims, No Drawings

WATER-SOFTENING COMPOSITIONS

BACKGROUND OF THE INVENTION

1. Field of the Invention

The present invention relates to water-softening compositions having improved biodegradability.

2. Discussion of the Background

The function of a water softener is to eliminate the calcium and magnesium ions from the water used in a washing process by complexation, dispersion and sequestration and thereby augment the detergent action of the surfactants used in the washing process. The softeners reduce the formation of deposits in the washing machine, for example on the heating elements.

According to J. Falbe, Surfactants in Consumer Products, pp. 292–293 (1987), water softeners conventionally predominantly comprise phosphates or mixtures of phosphates, zeolites and polycarboxylates. Although both types of softeners have a good ability to bind alkaline earth metal ions and an excellent dispersing and dirt-carrying ability, they have ecological disadvantages. Specifically, pollution of the wastewater with phosphates leads to over fertilization of natural waters and to the problems associated with eutrophication.

Combinations of zeolites and polycarboxylates are frequently used as substitutes for phosphate. Thus, DE-A-39 31 871 describes phosphate-free water-softening agents which predominantly comprise zeolite, sheet silicate and the sodium salt of a polycarboxylic acid, preferably an acrylic acid/maleic acid copolymer. A disadvantage of the polycarboxylates used today is that the polymers have only a low biodegradability and are therefore mineralized only to a small extent in a water treatment plant.

Thus, there remains a need for water-softening compositions which are free of the above-described drawbacks.

SUMMARY OF THE INVENTION

It is therefore an object of the present invention to provide water-softening compositions which do not have the stated ecological disadvantages.

It is another object of the present invention to provide water-softening compositions which exhibit good water-softening ability.

It is another object of the present invention to provide water-softening compositions which are biodegradable.

It is another object of the present invention to provide water-softening compositions which do not give rise to problems associated with eutrophication.

It is another object of the present invention to provide a method for softening water by adding such a water-softening agent to water.

It is another object of the present invention to provide a method for washing clothes by agitating the clothes while immersed in an aqueous composition of water, a detergent, and such a water-softening composition.

These and other objects, which will become apparent during the following detailed description, have been achieved by the inventors' discovery that compositions which, based on the total dry weight of the composition, comprise:

(a) from 1 to 90% by weight of a biodegradable copolymer built up of (A) a monoethylenically unsaturated dicarboxylic acid and/or salt thereof;

(B) a monoethylenically unsaturated monocarboxylic acid and/or salt thereof;

(C) a monounsaturated monomer which after polymerization and hydrolysis or saponification gives a monomer unit which has one or more hydroxyl groups on the carbon chain; and (D) from 0 to 15% by weight of another monomer capable of free-radical copolymerization;

(b) from 10 to 95% by weight of a water-softening inorganic silicate;

(c) from 0 to 80% by weight of another inorganic salt;

(d) from 0 to 70% by weight of a dispersing and complexing agent; and (e) from 0 to 5% by weight of a surfactant, exhibit a combination of good biodegradability and water-softening ability.

DETAILED DESCRIPTION OF THE PREFERRED EMBODIMENTS

Thus, in a first embodiment, the present invention provides water-softening compositions which exhibit both good biodegradability and good water-softening ability.

The present compositions preferably contain the component (a), the copolymer, in an amount from 5 to 80% by weight, with very particular preference being given to compositions containing from 5 to 30% by weight of copolymer (a), based on the total dry weight of the composition. Of course, it is to be understood that copolymer (a) may be a single copolymer or a mixture of copolymers. Suitably, copolymer (a) will have a weight average molecular weight of 500 g/mol to 5,000,000 g/mol, preferably 1,000 g/mol to 50,000 g/mol. By the term "built up" it is meant that copolymer (a) is obtainable by polymerizing a mixture of monomers (A), (B), (C), and (D), which is the same as saying that copolymer (a) contains repeating units derived from monomers (A), (B), (C), and (D).

Suitable monomers of group A are monoethylenically unsaturated $C_4$–$C_8$-dicarboxylic acids, anhydrides thereof and alkali metal and/or ammonium salts and/or amine salts thereof (including $NH_4^+$; mono-, di-, tri-, and tetra-$C_{1-4}$-alkylammonium; and mono-, di-, tri-, and tetra-$C_{2-4}$-alkanolammonium salts). Suitable dicarboxylic acids are, for example, maleic acid, fumaric acid, itaconic acid and methylenemalonic acid. Preference is given to using maleic acid, maleic anhydride, itaconic acid, itaconic anhydride and the corresponding sodium, potassium or ammonium salts of maleic or itaconic acid. The monomers of group A are present in the monomer mixture in amounts preferably from 10 to 70% by weight, particularly preferably from 20 to 60% by weight, and very particularly preferably from 25 to 55% by weight, based on the total weight of the mixture of monomers (A), (B), (C), and (D).

Suitable monomers of group B are monoethylenically unsaturated $C_3$–$C_{10}$-monocarboxylic acids and alkali metal and/or ammonium salts and/or amine salts thereof (including $NH_4^+$; mono-, di-, tri-, and tetra-$C_{1-4}$-alkylammonium; and mono-, di-, tri-, and tetra-$C_{2-4}$-alkanolammonium salts). Examples of these monomers are acrylic acid, methacrylic acid, dimethylacrylic acid, ethylacrylic acid, vinylacetic acid and allylacetic acid. From this group of monomers, preference is given to using acrylic acid, methacrylic acid, mixtures thereof and the sodium, potassium or ammonium salts or mixtures thereof. The monomers of group B are present in the monomer mixture in amounts of preferably from 20 to 85% by weight, particularly preferably from 25 to 60% by weight, and very particularly preferably from 30 to 60% by weight, based on the total weight of the mixture of monomers (A), (B), (C), and (D).

The monomers of group C are those which, after copolymerization and a subsequent hydrolysis or saponification of the polymer, liberate one or more hydroxyl groups which are directly covalently bound to the C—C carbon chain of the polymer. Examples which may be mentioned include: vinyl acetate, vinyl propionate, methylvinyl acetate, methyl vinyl ether, ethylene glycol monovinyl ether and vinylidene carbonate. The monomers of group C are present in the monomer mixture in amounts of preferably from 1 to 50% by weight, particularly preferably from 4 to 40% by weight, and very particularly preferably from 8 to 30% by weight, based on the total weight of the mixture of monomers (A), (B), (C), and (D).

Suitable monomers of group D, which can be used for modification of the copolymers, are, for example, sulfonyl-containing and sulfate-containing monomers such as, for example, (meth)allylsulfonic acid, vinylsulfonic acid, styrenesulfonic acid, acrylamidomethylpropanesulfonic acid and also monomers containing phosphonic acid groups, such as, for example, vinylphosphonic acid, allylphosphonic acid and acrylamidomethylpropanephosphonic acid and salts thereof and also hydroxyethyl(meth)acrylate sulfates, allyl alcohol sulfates and phosphates. Other monomers of group D which can also be used, albeit only in a limited amount because of the solubility required, are doubly ethylenically unsaturated non-conjugated compounds and also polyalkylene glycol esters of (meth)acrylic acid and polyalkylene glycol ethers with (meth)allyl alcohol which can optionally be end-blocked. The monomers of group D are present in the monomer mixture in amounts of optionally up to 15% by weight, preferably up to 10% by weight, based on the total weight of the mixture of monomers (A), (B), (C), and (D).

The copolymer (a) can be prepared by free-radical polymerization in aqueous medium. Such a polymerization is described, for example, in the German Patent Application No. P 43 00 772.4, which is incorporated herein by reference.

The copolymer (a) acts as a dispersing and complexing agent. Copolymer (a) binds multivalent metal ions, for example Ca, Mg, and Fe ions, in water-soluble complexes. Copolymer (a) disperses precipitated water hardness and dirt particles. Copolymer (a) has good environmental compatibility. The use of complexing and dispersing agents employed hitherto, such as, for example, phosphates, phosphonates, non-biodegradable polyacrylates, nitrilotriacetic acid (NTA), ethylenediaminetetraacetic acid (EDTA), which have ecological disadvantages, is generally unnecessary.

For the purposes of the present invention, a copolymer is biodegradable if in the modified OECD Sturm Test (EC directive 84/449/EEC C 5 and OECD guideline 301 B) (see, for example, Seifen-Öle-Fette-Wachse, vol. 117, 740 to 744 (1991)), they degrade to $\geqq$60%.

Besides copolymer (a), the compositions of the present invention also contain a water-softening inorganic silicate (b) such as, for example, sodium aluminum silicates of the zeolite A type and/or crystalline sodium silicates having a sheet structure. Preferably the inorganic silicate is present in amounts from 30 to 80% by weight, more preferably 40 to 80% by weight, based on the total anhydrous weight of the composition.

Furthermore, other inorganic salts, preferably alkali metal and ammonium salts of sulfuric, hydrochloric and carbonic acid, can also be present as component (c). Sodium sulfate can improve the particle structure of pulverulent products and granulated materials and favorably affect the flushing into the washing machine. If they are included in the composition, such inorganic salts are preferably present in amounts from 20 to 60% by weight, more preferably 20 to 30% by weight, based on the total dry weight of the composition.

Component (d) is preferably present in the composition in amounts from 2 to 40% by weight, preferably 5 to 30% by weight, based on the total dry weight of the composition. Suitable dispersing and complexing agents are, for example, citrates, $C_{8-12}$-phosphonates, isoserinediacetic acid, homo- and copolymers of acrylic acid and also ethylenediaminetetraacetic acid and nitrilotriacetic acid and also salts (including alkali metal; $NH_4^+$; mono-, di-, tri-, and tetra-$C_{1-4}$-alkylammonium; and mono-, di-, tri-, and tetra-$C_{2-4}$-alkanoammonium salts) of the above-mentioned compounds.

The present compositions can additionally contain from 0 to 5% by weight, preferably 0 to 3% by weight, based on the total dry weight of the composition, of an anionic, nonionic, or cationic surfactant. Suitable surfactants are described in Kirk-Othmer, *Encyclopedia of Chemical Technology,* 3rd. Ed., Wiley, New York, vol. 22, pp. 332–432 (1983), which is incorporated herein by reference.

In addition, the present composition may generally also contain customary additives such as, for example, water-soluble alkali metal metasilicates or alkali metal disilicates as corrosion inhibitors and also perfume oils and dyes in amounts totalling from 0 to 30% by weight.

The compositions of the present invention can be used as liquids, pulverulent products or granulated materials. In the case of a liquid composition, the present composition suitably further comprises water in an amount of 20 to 90% by weight, preferably 30 to 50% by weight, based on the total weight of the liquid composition.

The preparation of the liquid formulations can be carried out by mixing the components, by conventional means. The pulverulent products are customarily prepared by mixing the pulverulent components and optionally spraying on the liquid components or by spray drying an aqueous, liquid or pasty mixture of the starting components.

The compositions of the present invention can be used as water softeners, by adding the composition to the water to be softened. If the water hardness is high, they can also be added to detergents and cleaning agents. Depending on the amount of alkaline earth metal ions in the water to be softened, the present compositions are suitably added to the water in such an amount that the dry components are present in an amount of 0.1 to 10 g/l of water to be softened, preferably 0.3 to 3 g/l of water to be softened.

In comparison with formulations in which component a is replaced by a commercial compound, the compositions of the present invention have a better or at least equally good water-softening action. The compositions of the present invention additionally have improved biodegradability.

The present invention also provides a method for washing clothes by agitating clothes while immersed in an aqueous composition comprising water, a detergent, and a water-softening composition according to the present invention. Suitable detergents and washing conditions are described in, e.g. Kirk-Othmer, *Encyclopedia of Chemical Technology,* 4th Ed., Wiley, New York, vol. 7, pp. 1072–1117 (1993), which is incorporated herein by reference.

Other features of the invention will become apparent in the course of the following descriptions of exemplary embodiments which are given for illustration of the invention and are not intended to be limiting thereof.

EXAMPLES

Example 1

Copolymer

Free-radical polymerization of 35% by weight of maleic anhydride in the form of sodium maleate, 45% by weight of acrylic acid and 20% by weight of vinyl acetate in aqueous solution and subsequent saponification gives a copolymer having a weight average molecular weight of about 15,000 g/mol.

The copolymer obtained in aqueous solution is converted into a pulverulent product by spray drying.

Example 2

Biodegradability

The biodegradability of the copolymers is tested by the modified OECD Sturm Test corresponding to the EC directive 84/449/EEC C 5 and the OECD guideline 301 B.

For the substance specified in Example 1, a degradability of over 60% is determined.

Commercial polycarboxylates such as, for example, homopolyacrylates and copolymers of acrylic acid and maleic acid have, in comparison, lower biodegradability.

Example 3

Compositions

Pulverulent water-softening compositions of the following compositions are prepared from the copolymer of Example 1:

| | 1 wt. % | 2 wt. % | 3 wt. % |
|---|---|---|---|
| Zeolite A | 80 | 60 | 40 |
| Copolymer, pulverulent | 20 | 15 | 10 |
| Sodium sulphate, light | — | 20 | 30 |
| Sodium citrate dihydrate | — | — | 20 |
| Sodium disilicate | — | 5 | — |

Comparative composition:

| | 4 % |
|---|---|
| Zeolite A | 80 |
| Commercial polycarboxylate*) | 20 |

*)Acrylic acid/maleic acid copolymer, sodium salt, average molecular weight 70,000 (SOKALAN ® CP5 of BASF)

Example 4

1.0 g/l of composition 1 of the present invention or of comparative composition 4 are applied in a Linitest together with 5 g/l of a typical commercial detergent formulation comprising:

8% of n-alkylbenzenesulphonate, sodium salt

6% of fatty alcohol ethoxylate

2% of soap

25% of zeolite A

6% of acrylic acid/maleic acid copolymer, sodium salt

17% of sodium carbonate

5% of sodium metasilicate pentahydrate

20% of sodium perborate tetrahydrate

5% of tetraacetylethylenediamine

1% of carboxymethylcellulose

5% of sodium sulphate, light

Washing cycles: 10 washes

Washing temperature: 90° C.

Water hardness: 30° German hardness

The addition of the water-softener reduces the deposits on the fabric. The following table gives the ash content as a measure of the deposits.

| Formulation | 1 | 4 |
|---|---|---|
| Ash content (%) | 2.3 | 2.5 |

Use of the water-softening composition 1 of the present invention gives lower fabric incrustation than the comparative composition 4 which corresponds to the prior art.

The formulations claimed are therefore improved with respect to biodegradability and fabric incrustation.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A water-softening composition which, based on the total dry weight of said composition, comprises:

(a) from 1 to 90% by weight of a biodegradable copolymer built up of (A) a monoethylenically unsaturated dicarboxylic acid and/or salt thereof;

(B) a monoethylenically unsaturated mono-carboxylic acid and/or salt thereof;

(C) a monounsaturated monomer which after polymerization and hydrolysis or saponification gives a monomer unit which has one or more hydroxyl groups on the carbon chain; and (D) from 0 to 15% by weight of another monomer capable of free-radical copolymerization;

(b) from 10 to 95% by weight of a water-softening inorganic silicate;

(c) from 0 to 80% by weight of a another inorganic salt;

(d) from 0 to 70% by weight of a dispersing and complexing agent; and (e) from 0 to 5% by weight of a surfactant.

2. The composition of claim 1, wherein component (a) is present in an amount of from 5 to 80% by weight.

3. The composition of claim 2, wherein component (a) is present in an amount of from 5 to 30% by weight.

4. The composition of claim 1, wherein component (b) is present in an amount of from 30 to 80% by weight.

5. The composition of claim 1, wherein component (d) is present in an amount from 2 to 40% by weight.

6. A method of softening water, comprising adding to water a water-softening composition which, based on the total dry weight of said composition, comprises:

(a) from 1 to 90% by weight of a biodegradable copolymer built up of (A) a monoethylenically unsaturated dicarboxylic acid and/or salt thereof;

(B) a monoethylenically unsaturated mono-carboxylic acid and/or salt thereof;

(C) a monounsaturated monomer which after polymerization and hydrolysis or saponification gives a monomer unit which has one or more hydroxyl groups on the carbon chain; and (D) from 0 to 15% by weight of another monomer capable of free-radical copolymerization;

(b) from 10 to 95% by weight of a water-softening inorganic silicate;

(c) from 0 to 80% by weight of another inorganic salt;

(d) from 0 to 70% by weight of a dispersing and complexing agent; and (e) from 0 to 5% by weight of a surfactant.

7. The method of claim 6, wherein component (a) is present in said composition in an amount of from 5 to 80% by weight.

8. The method of claim 7, wherein component (a) is present in said composition in an amount of from 5 to 30% by weight.

9. The method of claim 6, wherein component (b) is present in said composition in an amount of from 30 to 80% by weight.

10. The method of claim 6, wherein component (d) is present in said composition in an amount from 2 to 40% by weight.

11. A method of washing clothes, comprising agitating said clothes when immersed in an aqueous composition comprising:

(i) water:

(ii) a detergent; and (iii) a water-softening composition, comprising:

(a) from 1 to 90% by weight of a biodegradable copolymer built up of (A) a monoethylenically unsaturated dicarboxylic acid and/or salt thereof;

(B) a monoethylenically unsaturated mono-carboxylic acid and/or salt thereof;

(C) a monounsaturated monomer which after polymerization and hydrolysis or saponification gives a monomer unit which has one or more hydroxyl groups on the carbon chain; and (D) from 0 to 15% by weight of another monomer capable of free-radical copolymerization;

(b) from 10 to 95% by weight of a water-softening inorganic silicate;

(c) from 0 to 80% by weight of another inorganic salt;

(d) from 0 to 70% by weight of a dispersing and complexing agent; and (e) from 0 to 5% by weight of a surfactant.

12. The method of washing clothes of claim 11, wherein component (a) is present in said composition in an amount of from 5 to 80% by weight.

13. The method of washing clothes of claim 12, wherein component (a) is present in said composition in an amount of from 5 to 30% by weight.

14. The method of washing clothes of claim 11, wherein component (b) is present in said composition in an amount of from 30 to 80% by weight.

15. The method of washing clothes of claim 11, wherein component (d) is present in said composition in an amount from 2 to 40% by weight.

* * * * *